United States Patent Office 2,968,620
Patented Jan. 17, 1961

2,968,620
INHIBITED SOLUBLE-OIL

Thomas H. Cafcas, Chicago, and Albert W. Lindert, Homewood, Ill., assignors to Standard Oil Company, Chicago, Ill., a corporation of Indiana No Drawing. Filed Oct. 28, 1957, Ser. No. 692,586

6 Claims. (Cl. 252—33.4)

This invention relates to soluble-oils and more particularly to the control of undesirable odor-producing phenomena due to certain bacteria encountered in certain uses of soluble-oils.

Soluble-oils are homogeneous compositions containing lubricating oil, soap and a small amount of water. Other ingredients are often present. The ingredients and their relative proportions are carefully chosen to achieve a "balanced" composition which has the appearance of a mineral oil but which will disperse on contact with water to form a very fine, stable, milk-like emulsion.

These soluble-oils have many uses which are well known to the art. Their major uses are as lubricating and rust preventive agents in connection with the cutting, threading, etc. of metals, and particularly ferrous metals. For this use the soluble-oil is dispersed in from 20 to 60 times its own volume of water and is put into a circulation system comprising a large tank or sump from which the dispersion is withdrawn and pumped over the metal being cut and the cutting tool. It then flows back to the sump for re-use.

Much difficulty has been encountered in this type of operation by virtue of the fact that the soluble-oil dispersion tends in the course of time to develop extremely strong, putrid and undesirable odors which, in extreme cases, render its continued use practically impossible. These phenomena occur particularly when the material being worked upon is a ferrous metal such as cast iron or malleable iron.

It is an object of our invention to provide means and methods for controlling these phenomena. Other and more detailed objects of our invention will become apparent as the description thereof proceeds.

This odor difficulty is caused by the action of one or more peculiar bacteria. These bacteria are believed to be facultative anaerobes, i.e. they will grow either aerobically or anaerobically. These odor-producing bacteria apparently feed on organic contamination which is more or less inevitably present in commercial cutting fluid systems and the like. They may also feed to some extent on constituents of the oil. When these bacteria reach high populations in the soluble-oil dispersion, their metabolic compounds can under some conditions control these products to give off a very fetid odor.

The common bactericidal agents such as phenol, cresol, etc. are ineffective in any usable concentration against these odor-producing bacteria. Certain complex phenolic compounds can under some conditions control these bacteria in a satisfactory manner when added to the soluble-oil or similar composition in amounts of from 0.05% to 4% and preferably from 0.1% to 3% by weight of the soluble-oil. However, for some unknown reason, such materials are not always effective.

We have found that the addition of beta naphthol in combination with the sodium salt of ortho-phenyl phenol (sodium ortho-phenyl phenate) effectively controls such bacteria growth in soluble-oil emulsions, under conditions where either of the components is less effective. Soluble-oil compositions containing from about 2% to about 4% beta naphthol and from about 2% to about 4% sodium ortho-phenyl phenate effectively control the growth of odor-forming bacteria when emulsified with water in ratios of 1 to 20 to 1 to 40 respectively. By using solubilizing agents such as alcohols, etc., the combination of beta naphthol and sodium orthophenyl phenate can be incorporated in the soluble-oil composition prior to its being emulsified or it can be added to the emulsified soluble-oil, or to a contaminated soluble-oil emulsion to effectively destroy the obpectionable odor-producing bacteria.

To combat the objectionable odor-producing bacteria, concentrates of beta naphthol and sodium ortho-phenyl phenate can be conveniently used. Such concentrates can be in the form of a dry cake or a water-misicible liquid concentrate. The dry cake concentrate can be readily prepared by mixing together equal parts of the beta naphthol and the sodium ortho-phenyl phenate and pressing the mixture into pellets of suitable size and shape. Such pellets are suspended in the soluble-oil system under treatment so that the bactericide dissolves slowly in the soluble-oil emulsion. Solubilizing or disintegrating agents such as soluble starch, citric acid plus sodium bicarbonate and sodium carbonate can be added to the dry mixture to increase the rate of solution.

Water miscible liquid concentrates can be prepared by blending about 15–30% beta naphthol, about 15–30% sodium ortho-phenyl phenate, about 4–25% water and about 35–60% of an alkyl alcohol of 1 to 4 carbon atoms such as methyl alcohol, isopropyl alcohol, and butyl alcohol. An example of a suitable water miscible concentrate is:

| | Percent |
|---|---|
| Beta naphthol | 20 |
| Sodium ortho-phenyl phenate | 20 |
| Water | 20 |
| Isopropanol | 40 |

The concentrates are added to the soluble emulsions in amounts to provide from about 0.05% to about 0.25%, and preferably to about 0.1%, of each of the active bactericides, namely the beta naphthol and the sodium ortho-phenyl phenate.

A great variety of soluble-oil formulations can be used in connection with the present invention. In general, such formulas will contain the following constituents, by weight:

| | Percent |
|---|---|
| Hydrocarbon oil | 60–85 |
| Soap (emulsifying agent) | 10–30 |
| Water | 0.25–4 |

In formulating the soluble-oil composition the base oil can be any hydrocarbon oil, such as a mineral oil, of suitable viscosity. Usually, hydrocarbon oils having a Saybolt viscosity in the range from about 75 seconds to about 350 seconds at 100° F. are preferred, although, depending upon the intended use, hydrocarbon oils having a Saybolt viscosity upwards of about 60 seconds at 100° F. can be employed.

The emulsifying agents used in the formulation of soluble-oil compositions are preferably alkali metal soaps, or ammonium soaps of preferentially oil-soluble sulfonic acids obtained in the treatment of hydrocarbon oils with strong or fuming sulfuric acid. The preferentially oil-soluble petroleum sulfonic acids, commonly referred to as mahogany acids because of their reddish-brown color, as well as their preparation, are well known in the art. The molecular weights of the preferentially oil-soluble sulfonic acids or mahogany acids obtained in the acid treatment of petroleum oils vary from about 420 to about 500, depending upon the petroleum oil treated and the amount of sulfuric acid employed. While any one of the preferentially oil-soluble sulfonic acids can be used, we prefer to use those acids having molecular weights within the range of 410 to 450, although soaps of mixtures of lower molecular weight sulfonic acids and higher sulfonic acids can be used.

In formulating soluble-oil compositions, it is frequently desirable to use in combination with the mahogany soaps other emulsifying agents or surface-active agents. For example, the mahogany soaps can be used in combination with potassium or sodium rosin soap or non-ionic surface-active agents, such as for example, polyoxyethylene sorbitan esters of mixed fatty and resin acids. A suitable ester of this type is a product marketed by the Atlas Powder Company as "G–8916–T." In addition to the basic components of soluble-oil compositions, namely, the emulsifying agent and the hydrocarbon oil, other constituents are usually included, such as an alcohol, for example, isopropyl alcohol, ethyl alcohol, etc., oleic acid, mono- di- or tri-ethanolamine, and usually a small amount of water sufficient to maintain the "balance" of the various components. For certain types of services, it is often the practice to incorporate in soluble-oil compositions an extreme pressure agent, such as for example, sulfurized fatty oils, sulfurized sperm oil, or other organic compounds containing active sulfur, as well as chlorinated organic compounds. Chip settling agents, such as a hydroxy aromatic acid, for example, tannic acid, of the type claimed in Cafcas et al. U.S. 2,668,146 issued February 2, 1954, can also be incorporated in the soluble-oil composition.

There are many soluble-oil formulations known to the art and the present invention is not limited to the addition of the mixture of beta naphthol and sodium ortho-phenyl phenate to any particular soluble-oil base, but is applicable to the use of such a mixture to any basic soluble-oil formula, for example, any of those of the following patents: Hughes 1,577,723; Johnson 1,619,074; Merrill 1,739,686; Adams 1,871,940; Strauch 1,909,080; Butts 1,979,250; Adams et al. 2,039,377; Adams et al. 2,243,994; Fabian et al. 2,097,085; Waugh 2,552,913, and others.

Illustrative of typical soluble-oil formulations in which the herein described solubilized mixture of beta naphthol and sodium orthophenyl phenate can be used are the following examples:

Example A

| | Percent |
|---|---|
| Sodium mahogany soap blend (50% soap—50% oil) | 30.0 |
| Dispersion agent [1] | 3.0 |
| Sulfurized sperm oil | 7.0 |
| Methyl lardate | 8.0 |
| Monoethanolamine | 1.0 |
| Petroleum oil | Remainder |

[1] Polyoxyethylene sorbitan ester of mixed fatty resin acids—marketed by Atlas Powder Company as G-8916-T.

Example B

| | Percent |
|---|---|
| Sodium mahogany soap | 18.8 |
| Sodium rosin soap | 3.5 |
| Ethanol | 1.3 |
| Water | 0.8 |
| 48° Bé—caustic soda | 0.09 |
| Petroleum oil | Remainder |

Example C

| | Percent |
|---|---|
| Sodium mahogany soap | 16.2 |
| Triethanolamine | 0.15 |
| Tannic acid | 1.77 |
| Oleic acid | 0.18 |
| Ethanol | 0.9 |
| Petroleum oil | Remainder |

Example D

| | Percent |
|---|---|
| Sodium mahogany soap | 25.5 |
| Sodium rosin soap | 3.5 |
| 48° Bé—caustic soda | 0.19 |
| Triethanolamine | 0.5 |
| Water | 0.8 |
| Petroleum oil | Remainder |

The solubilized beta naphthol and sodium o-phenyl phenate can be added to the above illustrative soluble-oil formulations in amounts sufficient to give a product containing from about 2% to about 4% of each, so that when such soluble-oils are emulsified with water in the ratio of from 1:20 to 1:40 respectively, the emulsified product will contain up to about 0.1% of each of the beta naphthol and the sodium o-phenyl phenate.

The effectiveness of the herein described invention in suppressing the growth of objectionable bacteria is demonstrated by the following data. To a contaminated soluble-oil emulsion were added various amounts of beta naphthol and sodium o-phenyl phenate separately and in combination and the emulsions aerated by air-blowing at about 78°–80° F. Plate counts were taken at intervals to determine bacterial population changes. A soluble-oil having the formulation of Example D, above, was used as a control.

Sample No. 1—Control emulsion.
Sample No. 2—No. 1+0.1% beta-naphthol.
Sample No. 3—No. 1+0.2% beta-naphthol.
Sample No. 4—No. 1+0.1% sodium o-phenyl phenate.
Sample No. 5—No. 1+0.2% sodium o-phenyl phenate.
Sample No. 6—No. 1+0.1% beta-naphthol +0.1% sodium o-phenyl phenate.

| Sample No. | 24 Hour Count | 96 Hour Count |
|---|---|---|
| 1 | 190 million/cc | 303 million. |
| 2 | 600,000 | 100,000. |
| 3 | 3,000 | Sterile. |
| 4 | 31 million | 28.5 million. |
| 5 | 14,000 | 30,000. |
| 6 | 2,000 | Sterile. |

It would appear that 0.2% beta naphthol above (Sample No. 3) effectively combats the bacteria growth. However, the apparent effectiveness is only temporary, since even 0.2% beta-napthol does not maintain low bacteria populations for more than two weeks. The reason for this is due to the fact that 0.1% is approximately the solubility of the beta-naphthol in water; amounts in excess of 0.1% provide temporary added inhibition, but the undissolved portion soon settles out and becomes deactivated. However, the mixture of beta naphthol and sodium o-phenyl phenate in amounts of up to 0.1% of each (Sample No. 6) does not possess this disability.

Unless otherwise stated, percentages given herein and in the appended claims are weight percentages.

We claim:
1. A water-miscible concentrate adapted to inhibit the formation of odor-producing bacteria in emulsifiable soluble-oil compositions used as lubricants and coolants in ferrous metal-working operations, consisting essentially of from about 15% to 30% beta naphthol, from about 15% to 30% sodium ortho-phenyl phenate, from about 4% to 25% water and from about 35% to 60% of an alkyl alcohol of from 1 to 4 carbon atoms, said concentrate being adapted to be incorporated in a soluble-oil emulsion in amounts sufficient to provide in said emulsion from about 0.05% to about 0.1% of said beta naphthol and of said sodium ortho-phenyl phenate.

2. A water miscible concentrate adapted to inhibit the formation of odor-producing bacteria in emulsifiable soluble-oil compositions used as lubricants and coolants in ferrous metal-working operations consisting essentially of about 20% beta naphthol, about 20% sodium orthophenyl phenate, about 20% water and about 40% isopropanol, said concentrate being adapted to be incorporated in a soluble-oil emulsion in amounts sufficient to provide in said emulsion from about 0.05% to about 0.1% of said beta naphthol and of said sodium ortho-phenyl phenate.

3. A soluble-oil, adapted for use in dilute aqueous dispersions as a lubricant and coolant in ferrous metal-working operations, inhibited against the development of objectionable odor-producing bacteria in concentrations above the threshold value at which odor formation becomes objectionable, comprising a hydrocarbon lubricating oil, as a major component, an emulsifying agent compatible with said oil, from about 2% to about 4% beta naphthol and from about 2% to about 4% sodium ortho-phenyl phenate, said soluble-oil being capable of dilution with sufficient amounts of water to give an emulsion containing from about 0.05% to 0.1% of said beta naphthol and of said sodium ortho-phenyl phenate.

4. A soluble-oil composition, adapted for use in dilute aqueous dispersions as a lubricant and coolant in ferrous metal-working operations, inhibited against the development of objectionable odor-producing bacteria in concentrations above the threshold value at which odor formation becomes objectionable, comprising from about 60% to about 85% of a viscous hydrocarbon oil, from about 10% to about 30% of an emulsifying agent, from about 0.25% to about 4% water, from about 2% to about 4% beta naphthol and from about 2% to about 4% sodium ortho-phenyl phenate, said soluble-oil being capable of dilution with sufficient amounts of water to give an emulsion containing from about 0.05% to 0.1% of said beta naphthol and of said sodium ortho-phenyl phenate.

5. A soluble-oil composition as described in claim 4 in which the emulsifying agent is a sodium soap of preferentially oil-soluble petroleum sulfonic acids.

6. In the metal-working of ferrous metals employing an aqueous emulsion of a soluble-oil as the lubricant and coolant in which odor-forming facultative anaerobic odor-producing bacteria are present in concentrations above the threshold value at which odor formation becomes objectionable, the method of combatting and inhibiting such bacteria growth comprising treating such soluble-oil emulsions with a concentrate composition consisting essentially of from 15% to 30% beta naphthol, from about 15% to 30% sodium ortho-phenyl phenate from about 4% to 25% water and from about 35% to 60% of an alkyl alcohol of from 1 to 4 carbon atoms, said concentrate being emulsified with sufficient water to give an emulsion containing from about 0.05% to 0.1% beta naphthol and from about 0.05% to 0.1% sodium ortho-phenyl phenate.

References Cited in the file of this patent

UNITED STATES PATENTS 2,171,555    Herb                 Sept. 5, 1939
2,780,598    Cafcas               Feb. 5, 1957

OTHER REFERENCES

Pivnick et al.: "Disinfection of Soluble Oil Emulsions," Jour. Amer. Soc. of Lubr. Eng., March 1957; page 152.

Osol-Farrar: The Dispensatory of The United States of America, 25th ed., Lippincott Co., 1955, pages 161 and 162.